United States Patent
Hart (10) Patent No.: US 9,528,575 B2
(45) Date of Patent: Dec. 27, 2016

(54) MULTI-SPEED TRANSMISSION HAVING A REDUCTION PLANETARY GEAR SET

(71) Applicant: GM Global Technology Operations LLC, Detroit, MI (US)

(72) Inventor: James M. Hart, Belleville, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 43 days.

(21) Appl. No.: 14/627,588

(22) Filed: Feb. 20, 2015

(65) Prior Publication Data

US 2016/0245372 A1    Aug. 25, 2016

(51) Int. Cl.
*F16H 3/66* (2006.01)

(52) U.S. Cl.
CPC ....... *F16H 3/666* (2013.01); *F16H 2200/0078* (2013.01); *F16H 2200/0086* (2013.01); *F16H 2200/2048* (2013.01); *F16H 2200/2097* (2013.01)

(58) Field of Classification Search
CPC .................. F16H 2200/2048; F16H 3/666
USPC ........................................................ 475/903
See application file for complete search history.

(56) References Cited

U.S. PATENT DOCUMENTS

| | | | |
|---|---|---|---|
| 2,478,869 A | 6/1946 | Hasbany | |
| 2,478,868 A * | 8/1949 | Hasbany | F16H 3/66 475/284 |
| 4,224,838 A | 9/1980 | Roushdy | |
| 4,229,996 A | 10/1980 | Hildebrand | |
| 5,919,111 A | 7/1999 | Park | |
| 5,993,347 A | 11/1999 | Park | |
| 6,960,149 B2 | 11/2005 | Ziemer | |
| 7,887,456 B2 * | 2/2011 | Kato | F16H 3/66 475/276 |
| 7,955,213 B2 * | 6/2011 | Kato | F16H 3/663 475/275 |
| 8,133,148 B2 | 3/2012 | Wittkopp | |
| 8,277,355 B2 | 10/2012 | Hart | |
| 8,343,005 B2 | 1/2013 | Hart | |
| 8,343,007 B2 | 1/2013 | Hart | |
| 8,512,196 B2 | 8/2013 | Mellet | |
| 8,715,130 B2 | 5/2014 | Mellet | |
| 8,715,131 B2 | 5/2014 | Mellet | |
| 9,074,663 B2 | 7/2015 | Mellet | |
| 2008/0020890 A1 | 1/2008 | Shim | |
| 2008/0248913 A1 * | 10/2008 | Kato | F16H 3/66 475/276 |
| 2009/0118058 A1 | 5/2009 | Suh | |
| 2010/0041507 A1 | 2/2010 | Gumpoltsberger | |
| 2010/0041509 A1 | 2/2010 | Gumpoltsberger | |
| 2010/0190601 A1 | 7/2010 | Phillips | |
| 2011/0009228 A1 | 1/2011 | Bauknecht | |

(Continued)

*Primary Examiner* — Sherry Estremsky (57) ABSTRACT

A transmission is provided having an input member, an output member, two planetary gear sets one of which is a selectively speed reducing gear set, another two planetary gear sets that may be stacked or nested to form a planetary gear set assembly, a plurality of coupling members and a plurality of torque transmitting devices. Each of the planetary gear sets includes first, second and third members. The stacked or nested planetary gear set assembly has a carrier member for rotatably supporting a first plurality of pinion gears and a second plurality of pinion gears, a ring gear and a common gear member. The torque transmitting devices include clutches and brakes.

24 Claims, 3 Drawing Sheets

(56) References Cited

U.S. PATENT DOCUMENTS

| | | |
|---|---|---|
| 2011/0009229 A1 | 1/2011 | Bauknecht |
| 2011/0015833 A1 | 1/2011 | Urata |
| 2012/0108383 A1 | 5/2012 | Saitoh |
| 2012/0302393 A1 | 11/2012 | Seo |
| 2013/0090206 A1 | 4/2013 | Mellet |
| 2013/0109527 A1 | 5/2013 | Mellet |
| 2013/0137544 A1 | 5/2013 | Mellet |
| 2016/0017960 A1* | 1/2016 | Beck ................. F16H 3/666 475/277 |
| 2016/0017961 A1* | 1/2016 | Beck ................. F16H 3/666 475/277 |

* cited by examiner

| GEAR STATE | GEAR RATIO | RATIO STEP | 36 | 28 | 30 | 38 | 26 | 32,32' | 34,34' |
|---|---|---|---|---|---|---|---|---|---|
| REV2 | -5.314 |  | X | X |  |  |  | X |  |
| REV1 | -13.286 | 2.500 | X | X |  |  |  |  | X |
| N |  | -0.990 |  |  |  |  |  |  |  |
| 1ST | 13.194 |  | X |  | X |  |  |  | X |
| 2ND | 9.000 | 1.470 | X |  |  | X |  |  | X |
| 3RD | 5.950 | 1.510 |  |  | X | X |  |  | X |
| 4TH | 5.277 | 1.130 | X |  |  | X |  | X |  |
| 5TH | 4.054 | 1.300 |  | X |  | X |  |  | X |
| 6TH | 3.600 | 1.130 | X |  |  | X |  | X |  |
| 7TH | 3.213 | 1.120 |  |  |  | X | X |  | X |
| 8TH | 2.500 | 1.290 |  | X | X |  |  |  | X |
| 8TH | 2.500 |  |  | X |  |  | X |  | X |
| 8TH | 2.500 |  |  |  | X |  | X |  | X |
| 9TH | 2.380 | 1.050 |  |  | X | X |  | X |  |
| 10TH | 1.621 | 1.470 |  | X |  | X |  | X |  |
| 11TH | 1.285 | 1.260 |  |  |  | X | X | X |  |
| 12TH | 1.000 | 1.290 |  |  |  |  |  |  |  |
| 12TH | 1.000 |  |  |  |  |  |  |  |  |
| 12TH | 1.000 |  |  |  | X | X |  | X |  |

X = ON - ENGAGED CARRYING TORQUE

FIG. 5

MULTI-SPEED TRANSMISSION HAVING A REDUCTION PLANETARY GEAR SET

FIELD

The invention relates generally to a multiple speed transmission having a plurality of planetary gear sets and a plurality of torque transmitting devices and more particularly to a transmission having twelve or more speeds, two planetary gear sets one of which is a selectively speed reducing gear set, another two planetary gear sets that are stackable and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios. Moreover, a transfer case is typically used in combination with the transmission to provide additional power take-offs for four wheel or all-wheel drive applications. The transfer case in some applications will have a low range gear set to provide a low speed ratio and a high torque capability. In order to provide this low range capability the transfer case typically employs a speed reducing gear set which is selectable using dog clutches.

While current transmissions and transfer cases achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact transmission having the capability of providing the transfer case selectable low range function.

SUMMARY

A multi-speed transmission is provided having an input member, an output member, two planetary gear sets, another two planetary gear sets that are stackable to form a stacked or nested planetary gear set assembly, a plurality of coupling members and a plurality of torque transmitting devices. Each of the two planetary gear sets includes first, second and third members. One of the planetary gear sets is configured to be a selectively speed reducing gear set. The stacked or nested planetary gear set assembly has a sun gear, a carrier member for rotatably supporting a first plurality of pinion gears and a second plurality of pinion gears, a common member and a ring gear. The common member is a ring and a sun gear integrally formed as a unitary member or a ring and a sun gear joined by a rigid fixed connection (i.e. a shaft or hub). The torque transmitting devices are for example clutches and brakes.

In another embodiment of the present invention, a transmission is provided having an input shaft, an output shaft, a planetary gear set assembly having a first member, a second member, a third member and a fourth member, a first planetary gear set having a first, a second and a third member and a second planetary gear set having a first, a second and a third member and configured to selectively reduce the output speed relative to the input speed of the gear set.

In yet another embodiment of the present invention, a first interconnecting member continuously interconnects the ring gear of the planetary gear set assembly with the ring gear of the first planetary gear set.

In yet another embodiment of the present invention, a second interconnecting member continuously interconnects the carrier member of the first planetary gear set with the sun gear of the second planetary gear set and the second planetary gear set is configured to selectively reduce a rotational speed of the output member relative to a rotational speed of the second interconnecting member.

In yet another embodiment of the present invention, a first torque transmitting mechanism is selectively engageable to interconnect the carrier member of the planetary gear set assembly with the sun gear of the first planetary gear set and the input member.

In yet another embodiment of the present invention, a second torque transmitting mechanism is selectively engageable to interconnect the common gear of the planetary gear set assembly with the sun gear of the first planetary gear set and the input member.

In yet another embodiment of the present invention, a third torque transmitting mechanism is selectively engageable to interconnect the common gear of the planetary gear set assembly with the carrier member of the first planetary gear set and the sun gear of the second planetary gear set.

In yet another embodiment of the present invention, a fourth torque transmitting mechanism is selectively engageable to interconnect the carrier member of the first planetary gear set and the sun gear of the second planetary gear set with the output shaft.

In yet another embodiment of the present invention, a fifth torque transmitting mechanism is selectively engageable to interconnect the carrier member of the second planetary gear set with the output shaft to reduce a rotational speed of the output shaft relative to a rotational speed of the second interconnecting member.

In yet another embodiment of the present invention, a sixth torque transmitting mechanism is selectively engageable to interconnect the carrier member of the planetary gear set assembly with the stationary member.

In yet another embodiment of the present invention, a seventh torque transmitting mechanism is selectively engageable to interconnect the sun gear of the planetary gear set assembly with the stationary member.

In yet another embodiment of the present invention, the torque transmitting mechanisms are selectively engageable in combinations of at least three to establish a plurality of forward speed ratios and at least one reverse speed ratio between the input member and the output member.

In yet another embodiment of the present invention, a multi-speed transmission is provided having an input shaft, an output shaft, a planetary gear set assembly having a sun gear, a ring gear, a carrier member and a common gear member, a first planetary gear set having a sun gear, a ring gear and a carrier member, a second planetary gear set having a sun gear, a ring gear and a carrier member, where the ring gear is rotationally fixed to a transmission housing. A first interconnecting member continuously interconnects the ring gear of the planetary gear set assembly with the ring gear of the first planetary gear set. A second interconnecting member continuously interconnects the carrier member of the first planetary gear set with the sun gear of the second planetary gear set. A first torque transmitting mechanism is selectively engageable to interconnect the carrier member of the planetary gear set assembly with the sun gear of the first planetary gear set and the input member. A second torque transmitting mechanism is selectively engageable to interconnect the common gear of the planetary gear set assembly with the sun gear of the first planetary gear set and the input member. A third torque transmitting mechanism is selectively engageable to interconnect the common gear of the planetary gear set assembly with the carrier member of the first planetary gear set and the sun gear of the second planetary gear set. A fourth torque transmitting mechanism is selectively engageable to interconnect the carrier member of the first planetary gear set and the sun gear of the second planetary gear set with the ring gear of the second planetary gear set. A fifth torque transmitting mechanism is selectively engageable to interconnect the ring gear of the second planetary gear set with the stationary member to reduce a rotational speed of the output shaft relative to a rotational speed of the second interconnecting member. A sixth torque transmitting mechanism is selectively engageable to interconnect the carrier member of the planetary gear set assembly with the stationary member. A seventh torque transmitting mechanism is selectively engageable to interconnect the sun gear of the planetary gear set assembly with the stationary member. The torque transmitting mechanisms are selectively engageable in combinations of at least three to establish a plurality of forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
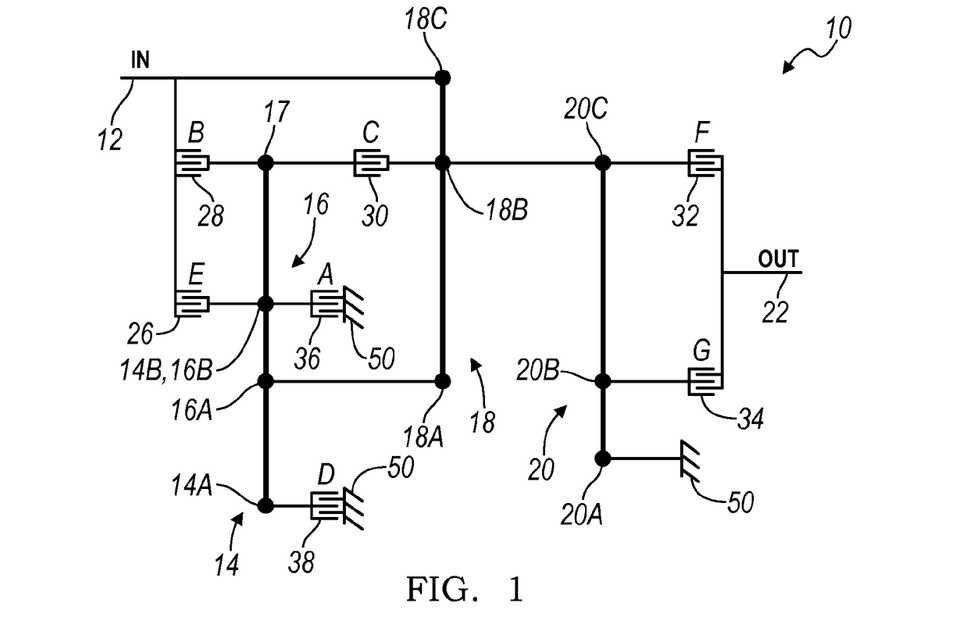
FIG. 1 is a lever diagram of an embodiment of a twelve speed transmission according to the present invention.

Referring now to FIG. 1, an embodiment of a twelve speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20 and an output shaft or member 22. In the lever diagram of FIG. 1, the levers for the first planetary gear set 14 and the second planetary gear set 16 have been combined into a single four node lever having: a first node 14A, a second node 16A, a third node 14B, 16B and a fourth node 17. Thus, the first and second planetary gear sets share a common member represented by node 17 and the second member 14B of the first planetary gear set is coupled to the second member 16B of the second planetary gear set, represented by third node 14B, 16B. The lever for the third planetary gear set 18 has: a first node 18A, a second node 18B, and a third node 18C. The lever for the fourth planetary gear set 20 has: a first node 20A, a second node 20B, and a third node 20C. The input member 12 is coupled to the third node 18C. Moreover, second node 16A is mechanically coupled to the first node 18A and the second node 18B is mechanically coupled to the third node 20C. Further, the first node 20A of the fourth planetary gear set 20 is mechanically coupled to ground or the transmission housing to prevent rotation of the first node 20A.

Transmission 10 further includes a plurality of clutches 26, 28, 30, 32, 34 and brakes 36 and 38. The first clutch 26 selectively connects the third node 14B, 16B of the combined levers of the first and second planetary gear sets 14, 16 with the input member or shaft 12 and the third node 18C of the third planetary gear sets 18. A second clutch 28 selectively connects the fourth node 17 of the combined levers of the first and second planetary gear sets 14, 16 with the input member or shaft 12 and the third node 18C of the third planetary gear sets 18. A third clutch 30 selectively connects the fourth node 17 of the combined levers of the first and second planetary gear sets 14, 16 with the second node 18B of the third planetary gear sets 18 and the third node 20C of the fourth planetary gear sets 20. The fourth clutch 32 selectively connects the third node 20C of the fourth planetary gear sets 20 and the second node 18B of the third planetary gear sets 18 with the output member 22. The fifth clutch 34 selectively connects the second node 20B of the fourth planetary gear sets 20 with the output member 22. The first brake 36 selectively connects the third node 14B, 16B of the combined levers of the first and second planetary gear sets 14, 16 with a stationary member or transmission housing 50. The second brake 38 selectively connects the first node 14A of the combined levers of the first and second planetary gear sets 14, 16 with a stationary member or transmission housing 50.

Figure 2:
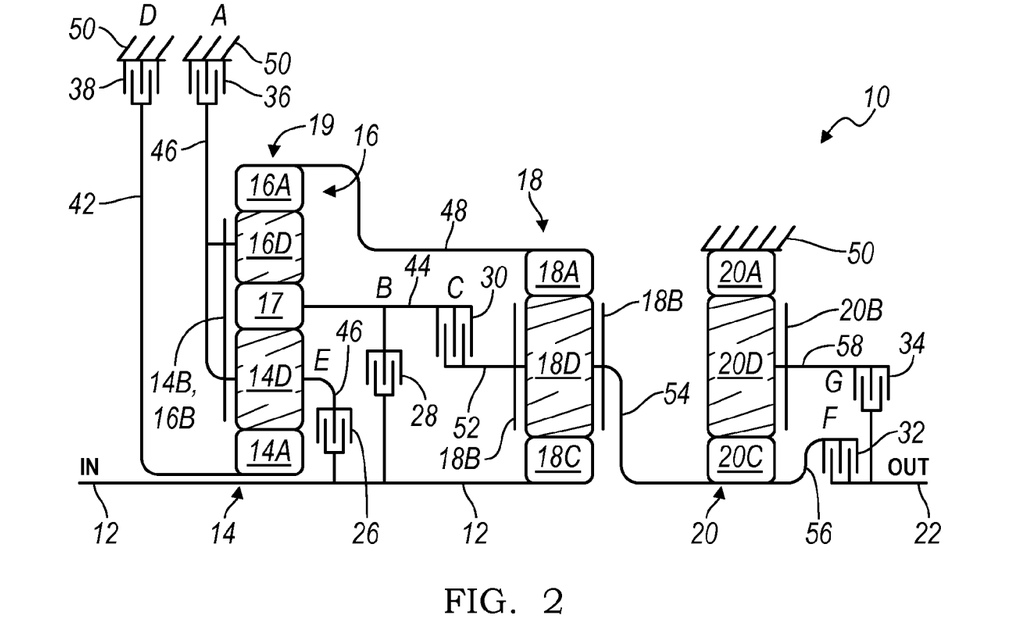
FIG. 2 is a diagrammatic illustration of an embodiment of a twelve speed transmission according to the present invention.

Referring now to FIG. 2, a stick diagram presents a schematic layout of the embodiment of the twelve speed transmission 10, in accordance with the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

Transmission 10 includes a planetary gear set assembly 19. Planetary gear set assembly 19 is formed from combining two planetary gear sets 14 and 16. The ring gear of planetary gear set 14 and the sun gear of planetary gear set 16 are formed as a single or common component or member 17. Thus, with respect to planetary gear set 14, component or gear 17 functions as a ring gear and with respect to planetary gear set 16, component or gear 17 functions as a sun gear. The shared component or common member 17 enables the first and second planetary gear sets 14 and 16 to be stacked or arranged radially, where the second planetary gear set 16 is positioned radially outward of the first planetary gear set 14 (as shown in FIG. 2). Accordingly, the shared component or common member 17 is a gear having an outer surface and an inner surface. The outer surface of common member or gear 17 has a plurality of gear teeth that enable the common member to function as a sun gear. The inner surface of common member 17 has a plurality of gear teeth that enable the common member to function as a ring gear. Moreover, the carrier members of planetary gear sets 14 and 16 are interconnected to form a common or shared carrier member 14B, 16B. Planetary gear set 14 also includes a sun gear member 14A. The sun gear member 14A is connected for common rotation with a first shaft or interconnecting member 42. The common member 17 is connected for common rotation with a second shaft or interconnecting member 44. The planet carrier member 14B,16B is connected for common rotation with a third shaft or interconnecting member 46. The planet gears 14D supported for rotation by planet carrier member 14B,16B are each configured to intermesh with both the sun gear member 14A and the common member 17. Further, planetary gear set 16 includes a ring gear member 16A. The ring gear member 16A is connected for common rotation with a fourth shaft or interconnecting member 48. The planet carrier member 14B,16B is connected for common rotation with the third shaft or interconnecting member 46. The planet gears 16D supported for rotation by planet carrier member 14B,16B are each configured to intermesh with both the ring gear member 16A and the common member 17.

Planetary gear set 18 includes a sun gear member 18C, a ring gear member 18A and a planet gear carrier member 18B that rotatably supports a set of planet gears 18D (only one of which is shown). The sun gear member 18C is connected for common rotation with the input shaft or member 12. The ring gear member 18A is connected for common rotation with the fourth shaft or interconnecting member 48. The planet carrier member 18B is connected for common rotation with a fifth shaft or interconnecting member 52 and a sixth shaft or interconnecting member 54. The planet gears 18D are each configured to intermesh with both the sun gear member 18C and the ring gear member 18A.

The planetary gear set 20 includes a ring gear member 20A, a sun gear member 20C and a planet gear carrier member 20B that rotatably supports a set of planet gears 20D (only one of which is shown). The sun gear member 20C is connected for common rotation with the sixth shaft or interconnecting member 54 and with a seventh shaft or interconnecting member 56. The ring gear member 20A is fixedly connected to the transmission housing 50 and thus is rotationally fixed. The planet carrier member 20B is connected for common rotation with an eighth shaft or interconnecting member 58. The planet gears 20D are each configured to intermesh with both the sun gear member 20C and the ring gear member 20A.

Transmission 10 further includes torque-transmitting mechanisms or clutches 26, 28, 30, 32 and 34, first brake 36 and second brake 38 that allow for selective interconnection of the shafts or interconnecting members, members of the planetary gear sets and the housing. For example, the first clutch 26 is selectively engageable to connect the input shaft or member 12 with the third shaft or interconnecting member 46. The second clutch 28 is selectively engageable to connect the input shaft or member 12 with the second shaft or interconnecting member 44. The third clutch 30 is selectively engageable to connect the second shaft or interconnecting member 44 with the fifth shaft or interconnecting member 52. The fourth clutch 32 is selectively engageable to connect the seventh shaft or interconnecting member 56 with the output shaft or interconnecting member 22. The fifth clutch 34 is selectively engageable to connect the eighth shaft or interconnecting member 58 with the output shaft or interconnecting member 22. The first brake 36 is selectively engageable to connect the third shaft or interconnecting member 46 with the stationary element or the transmission housing 50 in order to restrict the member 46 from rotating relative to the transmission housing 50. The second brake 38 is selectively engageable to connect the first shaft or interconnecting member 42 with the stationary element or the transmission housing 50 in order to restrict the member 42 from rotating relative to the transmission housing 50.

Moreover, planetary gear set 20 is configured to selectively provide a speed reduction and a torque increase of the output member 22 relative to the intermediate shaft 54. More specifically, ring gear member 20A is held stationary, sun gear member 20C receives a rotational input speed from intermediate shaft 54 and the carrier member 20B is connected to the output shaft 22 by engaging clutch 34. Advantageously, the transmission of the present invention provides a selectable low range function in the transmission through the use of the speed reduction planetary gear set 20. Thus, the need for an additional speed reducing gear set in the transfer case to provide a low range function is eliminated.

Figure 3:
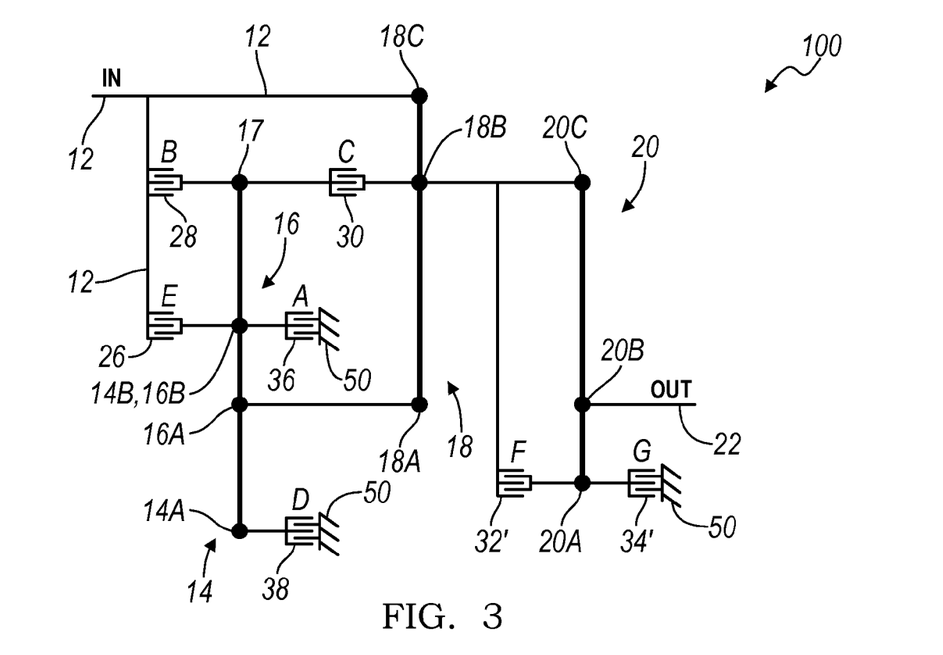
FIG. 3 is a diagrammatic illustration of another embodiment of a twelve speed transmission according to the present invention.

Referring now to FIG. 3, another embodiment of a twelve speed transmission 100 is illustrated in lever diagram form. Transmission 100 is similar to transmission 10 illustrated in FIG. 1 and described above, as indicated by like reference numbers referencing like components. However, clutch 32 has been removed and an alternate clutch 32' now connects nodes 18B and 20C with node 20A. Further, clutch 34 has been removed and an alternate brake 34' now connects node 20A with ground or transmission housing 50.

Figure 4:
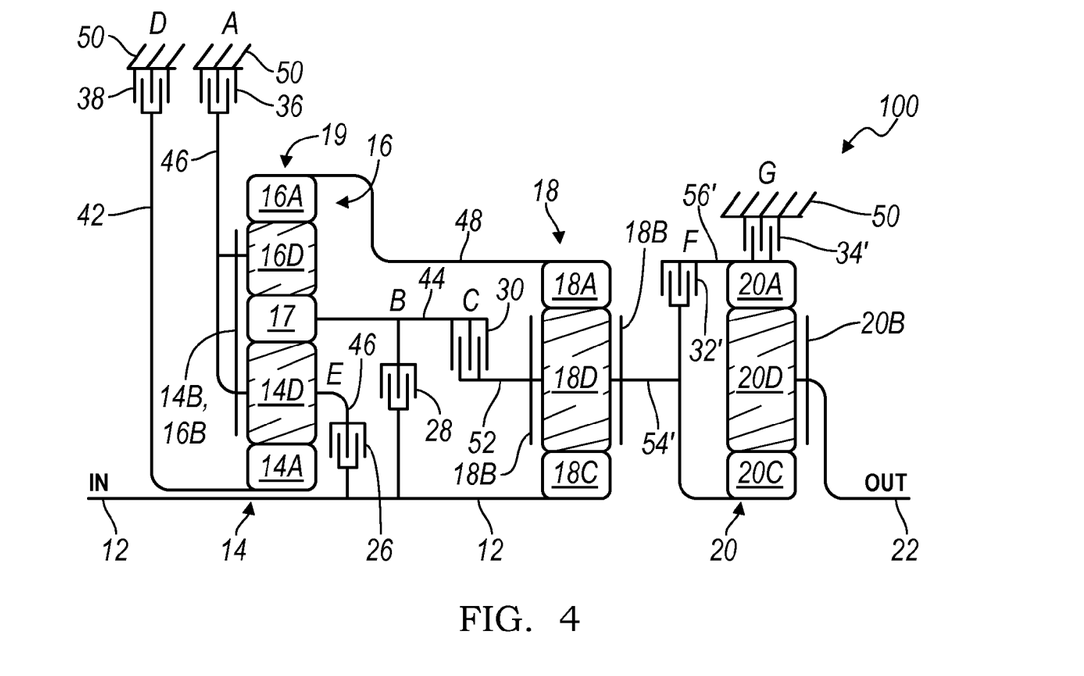
FIG. 4 is a diagrammatic illustration of another embodiment of a twelve speed transmission according to the present invention.

Referring now to FIG. 4, a stick diagram presents a schematic layout of the embodiment of the twelve speed transmission 100 according to the present invention. In FIG. 4, the numbering from the lever diagram of FIG. 3 is carried over. The clutches and couplings are correspondingly presented whereas the nodes of the planetary gear sets now appear as components of planetary gear sets such as sun gears, ring gears, planet gears and planet gear carriers. Transmission 100 of FIG. 4 is similar to transmission 10 illustrated in FIG. 2 and described above, as indicated by like reference numbers referencing like components. However, clutch 32 has been removed and a alternate clutch 32' now connects carrier member 18B and sun gear 20C through an alternate shaft 54' with ring gear 20A through alternate 56'. Further, clutch 34 has been removed and an alternate brake 34' now connects ring gear 20A with ground or transmission housing 50.

In the present embodiment, planetary gear set 20 is configured to selectively provide a speed reduction and a torque increase of the output member 22 relative to the intermediate shaft 54'. More specifically, ring gear member 20A is held stationary through the engagement of clutch 34', sun gear member 20C receives a rotational input speed from intermediate shaft 54' and the carrier member 20B is connected to the output shaft 22. Advantageously, the transmission of the present embodiment provides a selectable low range function in the transmission through the use of the speed reduction planetary gear set 20. Thus, the need for an additional speed reducing gear set in the transfer case to provide a low range function is eliminated.

Figure 5:
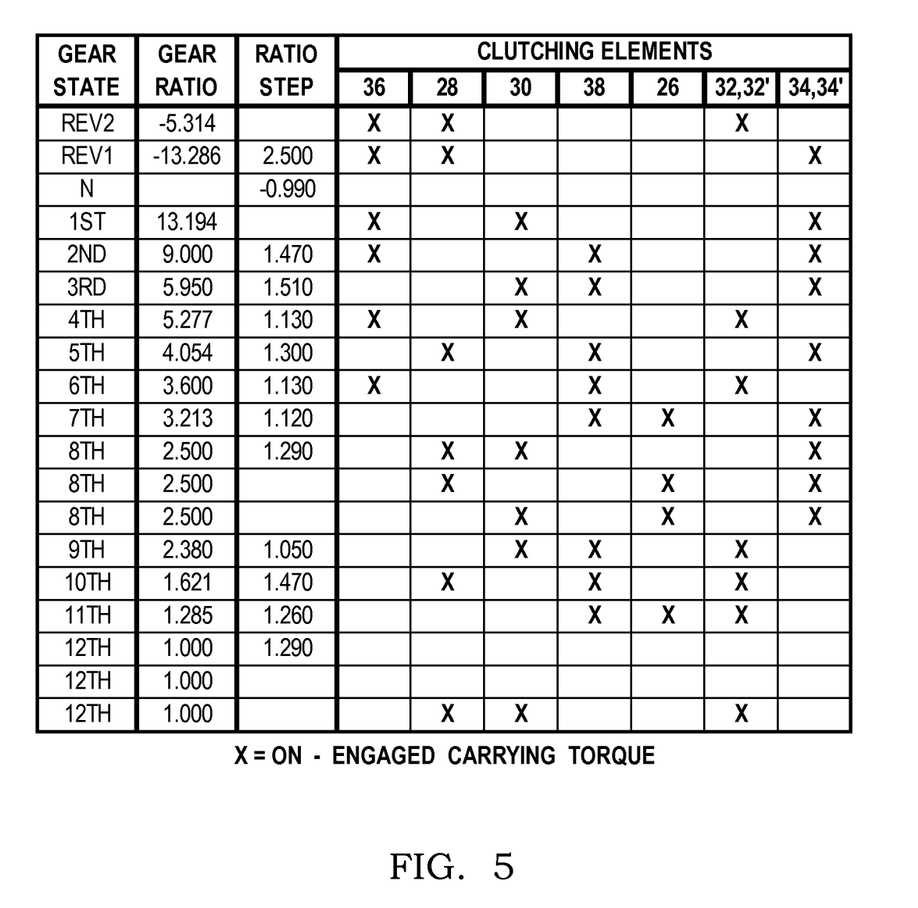
FIG. 5 is a truth table presenting the state of engagement of the various torque transmitting elements in each of the available forward and reverse speeds or gear ratios of the transmissions illustrated in FIGS. 1 through 4.

Referring now to FIG. 1 through FIG. 5, the operation of the embodiments of the twelve speed transmissions 10 and 100 will be described. It will be appreciated that transmissions 10 and 100 are capable of transmitting torque from the input shaft or member 12 to the output shaft or member 22 in at least twelve forward speed or torque ratios and at least one reverse speed or torque ratio. Each forward and reverse speed or torque ratio is attained by engagement of one or more of the torque-transmitting mechanisms, as will be explained below. FIG. 5 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria. Of course, other gear ratios are achievable depending on the gear diameter, gear teeth count and gear configuration selected.

With respect to transmission 10, a reverse gear ratio is established by activating second clutch 28, fifth clutch 34 and first brake 36. The second clutch 28 connects the input shaft or member 12 with the second shaft or interconnecting member 44. The fifth clutch 34 connects the eighth shaft or interconnecting member 58 with the output shaft or interconnecting member 22. The first brake 36 connects the third shaft or interconnecting member 46 with the stationary element or the transmission housing 50 in order to restrict the member 46 from rotating relative to the transmission housing 50. Likewise, the twelve forward ratios are achieved through different combinations of clutch and brake engagement, as shown in FIG. 5.

With respect to transmission 100, the gear ratios are established by activating the clutches and brakes as shown in FIG. 5. More specifically, gear ratios $4^{th}$, $6^{th}$, and $9^{th}$ through $12^{th}$ are activated through the engagement alternate clutch 32' and the combination of brakes and clutches shown in FIG. 5. Similarly, reverse, $1^{st}$, $2^{nd}$, $3^{rd}$, $5^{th}$, $7^{th}$ and $8^{th}$ are activated through the engagement alternate clutch 34' and the combination of brakes and clutches shown in FIG. 5. Likewise, the remaining forward ratios are achieved through different combinations of clutch and brake engagement, as shown in FIG. 5.

It will be appreciated that the foregoing explanation of operation and gear states of the twelve speed transmissions 10 and 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Moreover, the transmissions 10 and 100 of the present invention have additional advantageous features. For example, the transmissions 10 and 100 have two reverse gear ratios as shown in FIG. 5. Furthermore, the ratio step of the reverse gear speed precisely matches the ratio steps of the first two forward speeds. Additionally, the present invention contemplate alternative clutch and brake engagement or activation combinations to establish the $8^{th}$ and $12^{th}$ gear speeds, as shown in FIG. 5.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
    an input member;
    an output member;
    a planetary gear set assembly having a first member, a second member, a third member and a fourth member;
    a first planetary gear set having a first, a second and a third member, wherein the third member of the first planetary gear set is continuously interconnected with the input member;
    a first interconnecting member continuously interconnecting the second member of the planetary gear set assembly with the first member of the first planetary gear set;
    a second planetary gear set having a first, a second and a third member;
    a second interconnecting member continuously interconnecting the second member of the first planetary gear set with the third member of the second planetary gear set and wherein the second planetary gear set is configured to selectively reduce a rotational speed of the output member relative to a rotational speed of the second interconnecting member; and
    seven torque transmitting mechanisms selectively engageable to interconnect at least one of the members of the planetary gear set assembly, one of the members of the first and second planetary gear sets with at least one other of the members of the planetary gear set assembly, one other of the members of the first and second planetary gear sets, the input member, the output member and a stationary member, and
    wherein the torque transmitting mechanisms are selectively engageable in combinations of at least three to establish a plurality of forward speed ratios and at least one reverse speed ratio between the input member and the output member.

2. The transmission of claim 1 wherein a first of the seven torque transmitting mechanisms is selectively engageable to interconnect the third member of the planetary gear set assembly with the third member of the first planetary gear set and the input member.

3. The transmission of claim 2 wherein a second of the seven torque transmitting mechanisms is selectively engageable to interconnect the fourth member of the planetary gear set assembly with the third member of the first planetary gear set and the input member.

4. The transmission of claim 3 wherein a third of the seven torque transmitting mechanisms is selectively engageable to interconnect the fourth member of the planetary gear set assembly with the second member of the first planetary gear set and the third member of the second planetary gear set.

5. The transmission of claim 4 wherein a fourth of the seven torque transmitting mechanisms is selectively engageable to interconnect the second member of the first planetary gear set and the third member of the second planetary gear set with the output member.

6. The transmission of claim 5 wherein a fifth of the seven torque transmitting mechanisms is selectively engageable to interconnect the second member of the second planetary gear set with the output member to reduce a rotational speed of the output member relative to a rotational speed of the second interconnecting member.

7. The transmission of claim 6 wherein a sixth of the seven torque transmitting mechanisms is selectively engageable to interconnect the third member of the planetary gear set assembly with the stationary member.

8. The transmission of claim 7 wherein a seventh of the seven torque transmitting mechanisms is selectively engageable to interconnect the first member of the planetary gear set assembly with the stationary member.

9. The transmission of claim 1 wherein the first member of the planetary gear set assembly is a sun gear, the second member of the planetary gear set assembly is a ring gear, the third member of the planetary gear set assembly is a carrier member, the fourth member of the planetary gear set assembly is a common gear, the second members of the first and second planetary gear sets are carrier members, the third members of the first and second planetary gear sets are sun gears and the first members of the first and second planetary gear sets are ring gears.

10. The transmission of claim 9 wherein the common member is formed as a unitary gear member having an outer surface and an inner surface, wherein the outer surface has a plurality of gear teeth and the inner surface has a plurality of gear teeth.

11. The transmission of claim 10 wherein the unitary gear member meshes with a first plurality of pinion gears rotatably supported by the carrier member of the planetary gear set assembly and a second plurality of pinion gears rotatably supported by the carrier member of the planetary gear set assembly.

12. A transmission comprising:
an input member;
an output member;
a planetary gear set assembly having a first member, a second member, a third member and a fourth member;
a first planetary gear set having a first, a second and a third member,
wherein the third member of the first planetary gear set is continuously interconnected with the input member;
a second planetary gear set having a first, a second and a third member, wherein the second planetary gear set is a speed reducing gear set;
a first interconnecting member continuously interconnecting the second member of the planetary gear set assembly with the first member of the first planetary gear set;
a second interconnecting member continuously interconnecting the second member of the first planetary gear set with the third member of the second planetary gear set and wherein the second planetary gear set is configured to selectively reduce a rotational speed of the output member relative to a rotational speed of the second interconnecting member; and
seven torque transmitting mechanisms selectively engageable to interconnect at least one of the members of the planetary gear set assembly, one of the members of the first and second planetary gear sets with at least one other of the members of the planetary gear set assembly, one other of the members of the first and second planetary gear sets, the input member, the output member and a stationary member, and
wherein the torque transmitting mechanisms are selectively engageable in combinations of at least three to establish a plurality of forward speed ratios and at least one reverse speed ratio between the input member and the output member.

13. The transmission of claim 12 wherein a first of the seven torque transmitting mechanisms is selectively engageable to interconnect the third member of the planetary gear set assembly with the third member of the first planetary gear set and the input member.

14. The transmission of claim 13 wherein a second of the seven torque transmitting mechanisms is selectively engageable to interconnect the fourth member of the planetary gear set assembly with the third member of the first planetary gear set and the input member.

15. The transmission of claim 14 wherein a third of the seven torque transmitting mechanisms is selectively engageable to interconnect the fourth member of the planetary gear set assembly with the second member of the first planetary gear set and the third member of the second planetary gear set.

16. The transmission of claim 15 wherein a fourth of the seven torque transmitting mechanisms is selectively engageable to interconnect the second member of the first planetary gear set and the third member of the second planetary gear set with the first member of the second planetary gear set.

17. The transmission of claim 16 wherein a fifth of the seven torque transmitting mechanisms is selectively engageable to interconnect the first member of the second planetary gear set with the stationary member to reduce a rotational speed of the output member relative to a rotational speed of the second interconnecting member.

18. The transmission of claim 17 wherein a sixth of the seven torque transmitting mechanisms is selectively engageable to interconnect the third member of the planetary gear set assembly with the stationary member.

19. The transmission of claim 18 wherein a seventh of the seven torque transmitting mechanisms is selectively engageable to interconnect the first member of the planetary gear set assembly with the stationary member.

20. The transmission of claim 12 wherein the first member of the planetary gear set assembly is a sun gear, the second member of the planetary gear set assembly is a ring gear, the third member of the planetary gear set assembly is a carrier member, the fourth member of the planetary gear set assembly is a common gear, the second members of the first and second planetary gear sets are carrier members, the third members of the first and second planetary gear sets are sun gears and the first members of the first and second planetary gear sets are ring gears.

21. The transmission of claim 20 wherein the common member is formed as a unitary gear member having an outer surface and an inner surface, wherein the outer surface has a plurality of gear teeth and the inner surface has a plurality of gear teeth.

22. The transmission of claim 21 wherein the unitary gear member meshes with a first plurality of pinion gears rotatably supported by the carrier member of the planetary gear set assembly and a second plurality of pinion gears rotatably supported by the carrier member of the planetary gear set assembly.

23. A transmission comprising:
an input shaft;
an output shaft;

a planetary gear set assembly having a sun gear, a ring gear, a carrier member and a common gear member;
a first planetary gear set having a sun gear, a ring gear and a carrier member;
a second planetary gear set having a sun gear, a ring gear and a carrier member;
a first interconnecting member continuously interconnecting the ring gear of the planetary gear set assembly with the ring gear of the first planetary gear set;
a second interconnecting member continuously interconnecting the carrier member of the first planetary gear set with the sun gear of the second planetary gear set;
a first torque transmitting mechanism is selectively engageable to interconnect the carrier member of the planetary gear set assembly with the sun gear of the first planetary gear set and the input member;
a second torque transmitting mechanism is selectively engageable to interconnect the common gear of the planetary gear set assembly with the sun gear of the first planetary gear set and the input member;
a third torque transmitting mechanism is selectively engageable to interconnect the common gear of the planetary gear set assembly with the carrier member of the first planetary gear set and the sun gear of the second planetary gear set;
a fourth torque transmitting mechanism is selectively engageable to interconnect the carrier member of the first planetary gear set and the sun gear of the second planetary gear set with the output shaft;
a fifth torque transmitting mechanism is selectively engageable to interconnect the carrier member of the second planetary gear set with the output shaft to reduce a rotational speed of the output member relative to a rotational speed of the second interconnecting member;
a sixth torque transmitting mechanism is selectively engageable to interconnect the carrier member of the planetary gear set assembly with the stationary member;
a seventh torque transmitting mechanism is selectively engageable to interconnect the sun gear of the planetary gear set assembly with the stationary member, and
wherein the torque transmitting mechanisms are selectively engageable in combinations of at least three to establish a plurality of forward speed ratios and at least one reverse speed ratio between the input member and the output member.

24. A transmission comprising:
an input shaft;
an output shaft;
a planetary gear set assembly having a sun gear, a ring gear, a carrier member and a common gear member;
a first planetary gear set having a sun gear, a ring gear and a carrier member;
a second planetary gear set having a sun gear, a ring gear and a carrier member, wherein the ring gear is rotationally fixed to a transmission housing;
a first interconnecting member continuously interconnecting the ring gear of the planetary gear set assembly with the ring gear of the first planetary gear set;
a second interconnecting member continuously interconnecting the carrier member of the first planetary gear set with the sun gear of the second planetary gear set;
a first torque transmitting mechanism is selectively engageable to interconnect the carrier member of the planetary gear set assembly with the sun gear of the first planetary gear set and the input member;
a second torque transmitting mechanism is selectively engageable to interconnect the common gear of the planetary gear set assembly with the sun gear of the first planetary gear set and the input member;
a third torque transmitting mechanism is selectively engageable to interconnect the common gear of the planetary gear set assembly with the carrier member of the first planetary gear set and the sun gear of the second planetary gear set;
a fourth torque transmitting mechanism is selectively engageable to interconnect the carrier member of the first planetary gear set and the sun gear of the second planetary gear set with the ring gear of the second planetary gear set;
a fifth torque transmitting mechanism is selectively engageable to interconnect the ring gear of the second planetary gear set with the stationary member to reduce a rotational speed of the output member relative to a rotational speed of the second interconnecting member;
a sixth torque transmitting mechanism is selectively engageable to interconnect the carrier member of the planetary gear set assembly with the stationary member;
a seventh torque transmitting mechanism is selectively engageable to interconnect the sun gear of the planetary gear set assembly with the stationary member, and
wherein the torque transmitting mechanisms are selectively engageable in combinations of at least three to establish a plurality of forward speed ratios and at least one reverse speed ratio between the input member and the output member.

* * * * *